United States Patent
Nakagawa

(10) Patent No.: US 8,050,539 B2
(45) Date of Patent: Nov. 1, 2011

(54) DATA RECORDING/REPRODUCING APPARATUS AND METHOD

(75) Inventor: Toshiyuki Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1645 days.

(21) Appl. No.: 11/219,479

(22) Filed: Sep. 2, 2005

(65) Prior Publication Data

US 2006/0051057 A1    Mar. 9, 2006

(30) Foreign Application Priority Data

Sep. 3, 2004   (JP) .................................. 2004-256386

(51) Int. Cl.
    *H04N 5/917* (2006.01)
(52) U.S. Cl. .......................... 386/329; 386/345; 386/347
(58) Field of Classification Search ............... 386/95–96
    See application file for complete search history.

(56) References Cited

U.S. PATENT DOCUMENTS

| 6,249,640 B1 * | 6/2001 | Takiguchi et al. | 386/82 |
| 6,628,890 B1 * | 9/2003 | Yamamoto et al. | 386/68 |
| 7,062,758 B2 * | 6/2006 | Yokoyama | 717/136 |

FOREIGN PATENT DOCUMENTS

| JP | 11-261964 | 9/1999 |
| JP | 2000-224543 | 8/2000 |

* cited by examiner

*Primary Examiner* — Jamie Atala
(74) *Attorney, Agent, or Firm* — Cowan, Liebowitz & Latman, P.C.

(57) ABSTRACT

Information that identifies key frames in video data within multimedia data is generated as reproduction controlling data and the reproduction controlling data is positioned at a predetermined position in the multimedia data. Upon special reproduction, the reproduction controlling data can be used to easily identify, read out, and reproduce key frames that should be used for random access and the like. By positioning the reproduction controlling data in an area within the multimedia data that is ignored by conventional apparatuses, file compatibility can be also maintained. This attains increased efficiency of special reproduction processing of multimedia that has ISO Base file format or a similar format.

7 Claims, 9 Drawing Sheets

FIG. 1

| | | | | | | | | |
|---|---|---|---|---|---|---|---|---|
| ftyp | | | | | | * | 4.3 | file type and compatibility |
| moov | | | | | | * | 8.1 | container for all the meta-data |
| | mvhd | | | | | * | 8.3 | movie header, overall declarations |
| | trak | | | | | * | 8.4 | container for an individual track or stream |
| | | tkhd | | | | * | 8.5 | track header, overall information about the track |
| | | tref | | | | | 8.6 | track reference container |
| | | edts | | | | | 8.25 | edit list container |
| | | | elst | | | | 8.26 | an edit list |
| | | mdia | | | | * | 8.7 | container for the media information in a track |
| | | | mdhd | | | * | 8.8 | media header, overall information about the media |
| | | | hdlr | | | * | 8.9 | handler, declares the media (handler) type |
| | | | minf | | | * | 8.10 | media information container |
| | | | | vmhd | | | 8.11.2 | video media header, overall information (video track only) |
| | | | | smhd | | | 8.11.3 | sound media header, overall information (sound track only) |
| | | | | hmhd | | | 8.11.4 | hint media header, overall information (hint track only) |
| | | | | dinf | | * | 8.12 | data information box, container |
| | | | | | dref | * | 8.13 | data reference box, declares source(s) of media data in track |
| | | | | stbl | | * | 8.14 | sample table box, container for the time/space map |
| | | | | | stsd | * | 8.16 | sample descriptions (codec types, initialization etc.) |
| | | | | | stts | * | 8.15.2 | (decoding) time-to-sample |
| | | | | | ctts | | 8.15.3 | (composition) time to sample |
| | | | | | stsc | * | 8.18 | sample-to-chunk, partial data-offset information |
| | | | | | stsz | | 8.17.2 | sample sizes (framing) |
| | | | | | stz2 | | 8.17.3 | compact sample sizes (framing) |
| | | | | | stco | * | 8.19 | chunk offset partial data-offset information |
| | | | | | co64 | | 8.19 | 64-bit chunk offset |
| | | | | | stss | | 8.20 | sync sample table (random access points) |
| | | | | | stsh | | 8.21 | shadow sync sample table |
| | | | | | padb | | 8.23 | sample padding bits |
| | | | | | stdp | | 8.22 | sample degradation priority |
| | mvex | | | | | | 8.29 | movie extends box |
| | | trex | | | | * | 8.30 | track extends defaults |
| moof | | | | | | | 8.31 | movie fragment |
| | mfhd | | | | | * | 8.32 | movie fragment header |
| | traf | | | | | | 8.33 | track fragment |
| | | tfhd | | | | * | 8.34 | track fragment header |
| | | trun | | | | | 8.35 | track fragment run |
| mdat | | | | | | | 8.2 | media data container |
| free | | | | | | | 8.24 | free space |
| skip | | | | | | | 8.24 | free space |
| | udta | | | | | | 8.27 | user-data |
| | | cprt | | | | | 8.28 | copyright etc. |

FIG. 5

```
aligned (8) class RandomAcccessPointBox extends FullBox('rdap',version=0,0)
{
    unsigned int(32) entry_count;
    int i;
    for (i=0; i < entry_count; i++) {
        unsigned int(32)   sample_timestamp;
        unsigned int(32)   sample_offset;
        unsigned int(32)   sample_size;
    }
}
```

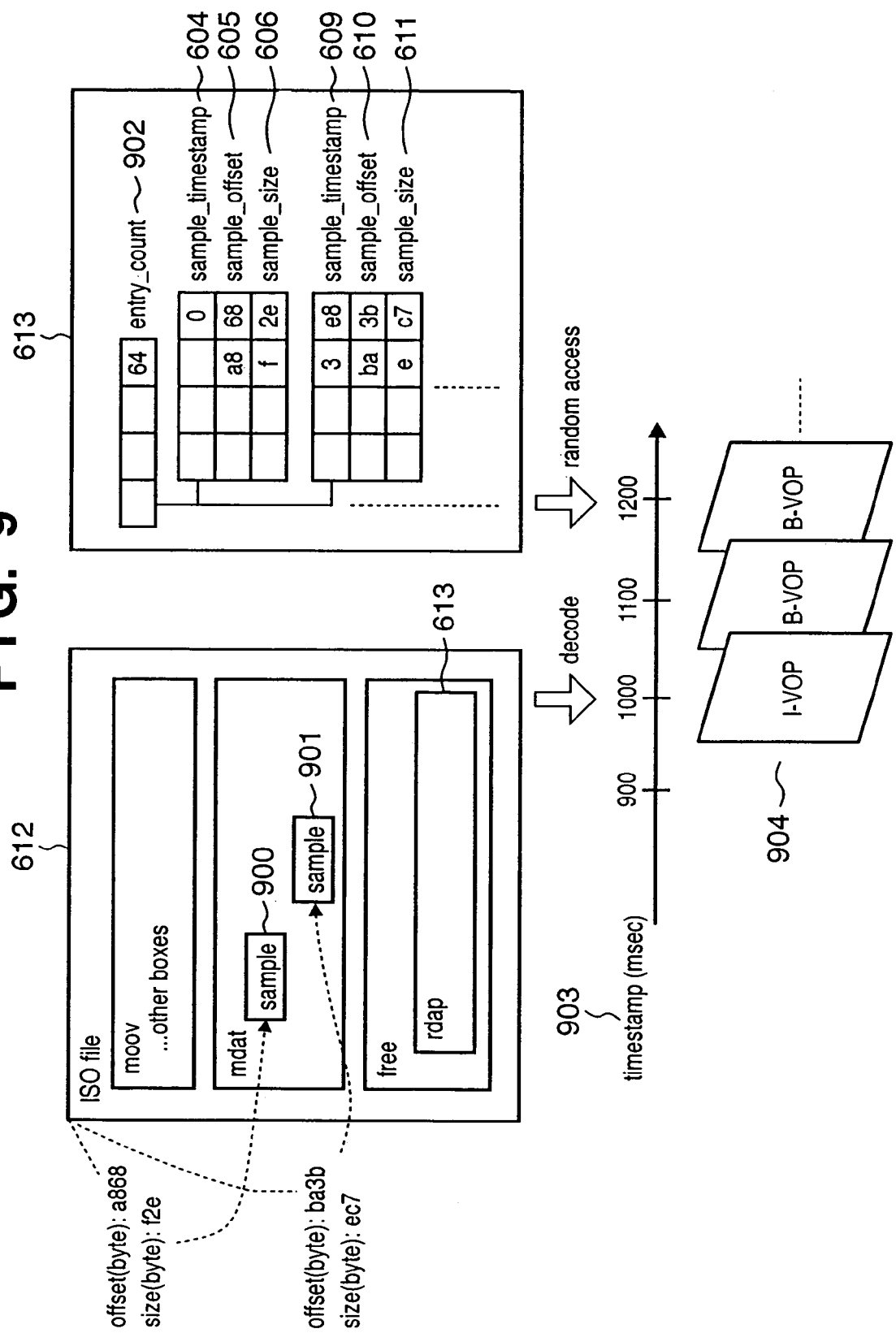

DATA RECORDING/REPRODUCING APPARATUS AND METHOD

FIELD OF THE INVENTION

The present invention relates to a technique for recording and reproducing multimedia data including video data, in particular, to a technique for efficiently processing special reproduction of multimedia data that has ISO Base Media File Format or a similar format.

BACKGROUND OF THE INVENTION

In recent years, processing capability of mobile phones, PDAs, personal computers (PC), and various other types of computing devices has significantly improved, enabling such devices to readily handle multimedia data such as video and audio.

Techniques for compression-encoding such video and audio have also improved and known techniques include MPEG-2 and MPEG-4 methods that are standardized by ISO (International Organization for Standardization) as international standards. In those MPEG compression encoding methods, images are constructed from pictures of three types: I, P, and B (VOP), depending on which predictive coding schemes is applied. An I picture is an intra-frame encoded image, a P picture is an inter-frame forward predictive-coded image that uses a past image, and a B picture is a bi-directional predictive-coded image that uses both a past image and a future image.

Among these three types of pictures, only I pictures can be decoded without other pictures. Thus, operation such as special reproduction (e.g. random access and fast-forward) that disturbs the order of frames is realized by accessing an I picture that serves as the reference of decoding.

However, since access to an I picture during random access is a complicated process, it is desirable to make decoding processing more efficient and reduce delay. Thus, a technique has been proposed that reliably obtains I picture data and implement special reproduction smoothly in a recording/reproducing apparatus for image data that is compressed and encoded in MPEG-2 (see Japanese Patent Laid-Opens No. 11-261964 and No. 2000-224543, for example).

In addition, ISO has standardized ISO Base Media File Format (hereinafter referred to just "ISO file format") as a basic format for a flexile and extensible media file format that facilitate exchange, management, and edit of media (ISO/IEC 14496-12).

On the basis of the ISO file format, file formats that are extended for recording data of a certain encoding format have been also standardized, including MP4 file format for recording MPEG-4 video and audio coded data (ISO/IEC 14496-14), Motion JPEG 2000 file format (ISO/IEC 15444-3), AVC file format (ISO/IEC 14496-15), 3GPP file format that is a standardization project for the third-generation mobile communication system (3rd Generation Partnership Project), and 3GPP2 file format (3rd Generation Partnership Project 2) that is a project derived from 3GPP.

The ISO file format (and the above-described file formats that are based on the same) consists of a nested data structure called "Box" as shown below:

```
class Box {
    unsigned int(32) size;
    byte type[4];
    byte data[ ];
};
```

The "size" is a field that indicates the data length of Box.

The "type" is a field indicating the type of Box, for which an identifier of four characters (four bytes) assigned to each Box is set.

The "data" is substance of data included by Box, having different contents depending on "type". As Box can have a hierarchical structure and include one or more Boxes, "data" may be another Box.

FIG. 1 shows listing of Boxes that are defined in the ISO file format.

In the figure, the leftmost to the sixth columns indicate the type of Boxes that are defined in the ISO file format and inclusion relationship among them. The rightmost column provides description of Box in a corresponding row.

As mentioned above, each Box is assigned four-byte "type" for identifying its type, which is represented by four alphanumeric characters. This four-character "type" is given in the six left columns. In the following discussion, this "type" will be used to refer to a particular Box.

A relationship in which one Box includes another Box is indicated by a positional relationship of columns. The table means that Box in one column includes Box that is indicated in a column positioned right to the column. For example, "moov" shown in the second row from the top is meant to include "mvhd", "trak", and "mvex".

FIG. 2 illustrates a simplified data structure of the ISO file format. As shown, Box structure of the ISO file format typically consists of moov 201 for storing meta data for media data such as management information for video and audio samples and mdat 202 that stores actual media data such as sample data of video and audio.

Moov 201 includes Box that is called "trak" 203 corresponding to respective media data. Also, media data in mdat 202 is stored as separated into sets of multiple continuous samples of video and audio that are called "chunk" and an array of chunk is stored in data field of mdat 202. The size of chunk and the number of samples contained in it are not specifically limited and chunk having any size and any number of samples can be constructed and stored in accordance with environment and context.

For such ISO file format, a data structure has been defined for identifying a random access point as information for random access (special reproduction) processing.

Random access is performed mainly by using child Box included in stbl 204.

Stts (time-to-sample) 205 indicates to which time a track sample corresponds. This Box is used to find the first sample prior to a given time. Although stts 205 has been referred to as an example here, Box called ctts in FIG. 1 can be also used to find the first sample prior to a given time as well.

However, since a sample found may not be a random access point, subsequent Boxes need be further checked to find the closest random access point.

Stts (sync sample table) 206 indicates which sample is an actual random access point. By using this Box, the first sample number prior to a given time can be searched for. In absence of stts 206, random access would be easy because it means that all the samples are random access points.

At this point, a sample number that should be used for random access has been found. Next, stsc (sample-to-chunk) 207 is used in order to determine in which chunk the sample number is positioned.

Further, stco (chunk offset) 208 is used for determining where the chunk starts. While stco has been referred to as an example, Box called co64 (64 bit chunk offset) shown in FIG. 1 may also be used to obtain the offset position of a chunk as well.

Starting with this offset, the size of each of the samples that exist up to the location at which the target sample is positioned within that chunk is obtained from stsz (sample size) 209 and the total sum of the samples is calculated. The target chunk offset position plus the overall size will be the position at which the target sample starts.

The start position and size of the sample thus obtained can be used to identify sample data that should be used for random access from mdat 202.

However, the technique proposed by the Japanese Patent Laid-Open No. 11-261964 is a technique for realizing increased efficiency of high-speed reproduction using a management file that is recorded separately from multiplexed video and audio data. Thus, the technique has a problem of inability to attain efficient high-speed playback if correlation between contents and its corresponding management file is broken due to copying of contents data, for example.

Also, the technique proposed by the Japanese Patent Laid-Open No. 2000-224543 is a technique for realizing efficient special reproduction of MPEG-2 image data in a recording/reproducing apparatus. The patent does not mention how to efficiently perform processing of ISO Base Media File Format in special reproduction.

Processing using a data structure that identifies a random access point as outlined above may allow access to desired data for special reproduction data having ISO file format. However, the processing is time consuming because the structure and correlation of a header is complicated.

SUMMARY OF THE INVENTION

The invention has been made in view of such drawbacks and has the object of implementing frame extraction processing necessary for special reproduction of data having the ISO file format or a similar format with higher efficiency.

According to an aspect of the present invention, there is provided a data recording apparatus, comprising: key frame detection means for detecting randomly-accessible key frames from encoded video data; control data generation means for, each of the key frames that are detected by the key frame detection means, generating reproduction controlling data that contains information that can identify the time/data location within the video data; and data generation means for generating data that contains the video data and the reproduction controlling data.

According to another aspect of the present invention, there is provided a data reproduction apparatus for reproducing data that contains encoded video data and reproduction controlling data including information that can identify the time/data location of randomly-accessible key frames contained in the video data, the apparatus comprising: data determination means for determining a key frame within the video data that should be reproduced from a reproduction start time designated by a special reproduction request and from the reproduction controlling data; read-out means for reading data for the key frame within the video data that should be reproduced using the reproduction controlling data from the video data; and reproduction means for decoding and reproducing the read-out key frame data.

According to another aspect of the present invention, there is provided a data recording method, comprising the steps of: a key frame detection step of detecting randomly-accessible key frames from encoded video data; a control data generating step of generating reproduction controlling data that contains information that can identify the time/data location within the video data for each of key frames that are detected at the key frame detecting step; and a data generating step of generating data that contains the video data and the reproduction controlling data.

According to another aspect of the present invention, there is provided a data reproduction method for reproducing data that contains encoded video data and reproduction controlling data including information that can identify the time/data location of randomly-accessible key frames contained in the video data, the method comprising the steps of: a data determination step of determining a key frame within the video data that should be reproduced from a reproduction start time designated by a special reproduction request and from the reproduction controlling data; a reading out step of reading data for the key frame within the video data that should be reproduced using the reproduction controlling data from the video data; and a reproduction step of decoding and reproducing the read-out key frame.

With such a configuration, according to the invention, frame extraction processing necessary for special reproduction of data having the ISO file format or a similar format can be made more efficient.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 shows the listing of Boxes that are defined in the ISO file format;

FIG. 5 shows a structure of control data that is generated by the data recording apparatus according to the embodiment of the invention;

FIG. 9 illustrates a specific example of processing where the data reproduction apparatus according to the embodiment of the invention performs special reproduction using control data.

DETAILED DESCRIPTION OF THE PREFERRED EMBODIMENTS

In the following, the invention will be described in detail in accordance with its preferred embodiments as applied to an apparatus for recording/reproducing a data structure of ISO file format with reference to the appended drawings.

The embodiments will be described for a case where content data has the ISO file format. However, the application of the invention is not limited to ISO file format. The invention is applicable to content data that uses a similar file format and an architecture, e.g. a file format that is based on the ISO file format including MP4 file format, AVC file format, and 3GPP file format mentioned above.

Also, specific configurations and techniques described below are intended to be illustrative only and non-limiting, and it will be readily appreciated by those skilled in the art that other equivalents and variations may be also utilized.

First Embodiment (Recording Apparatus)

Figure 2:
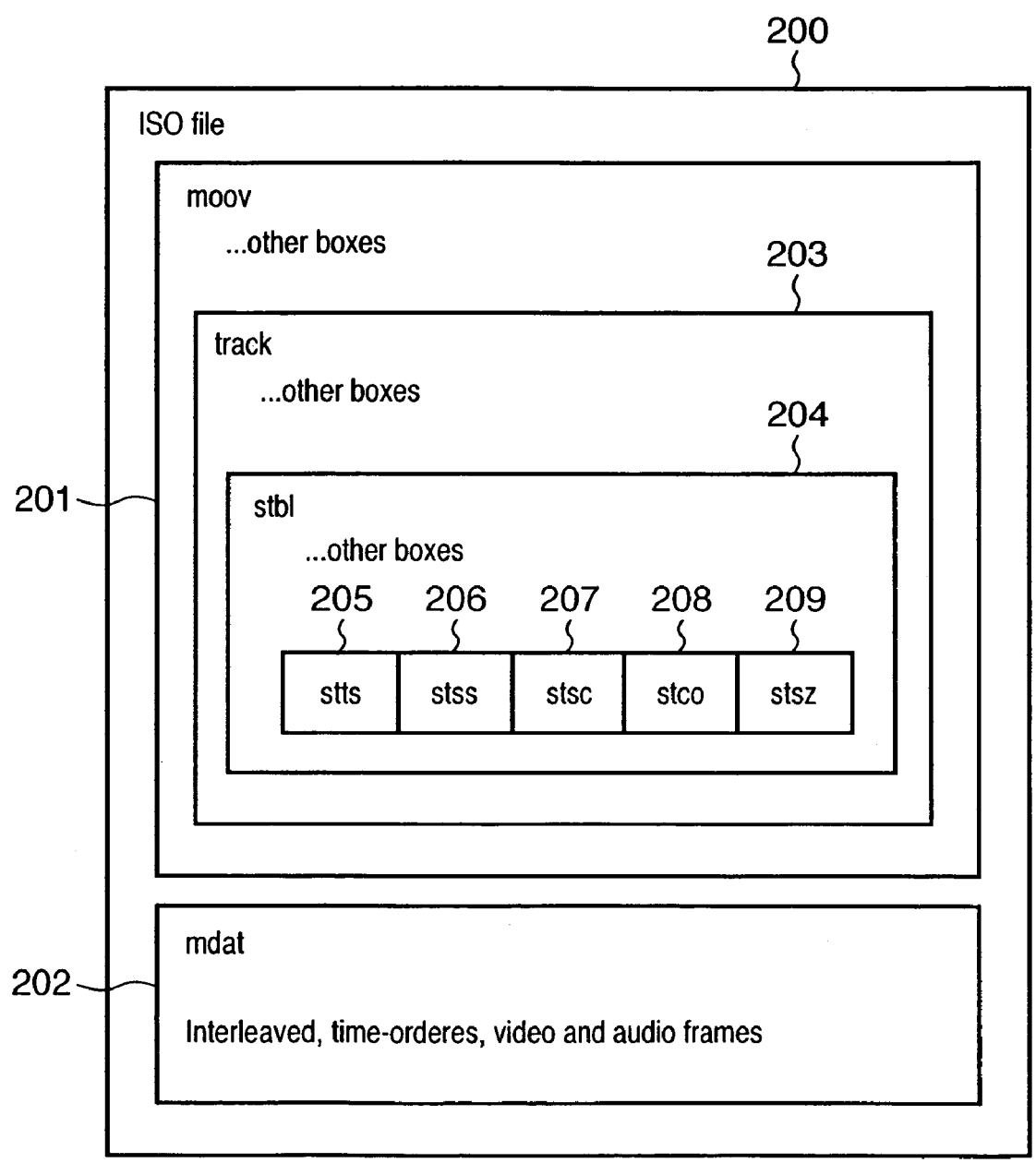
FIG. 2 shows a simplified data structure of ISO file format.
Figure 3:
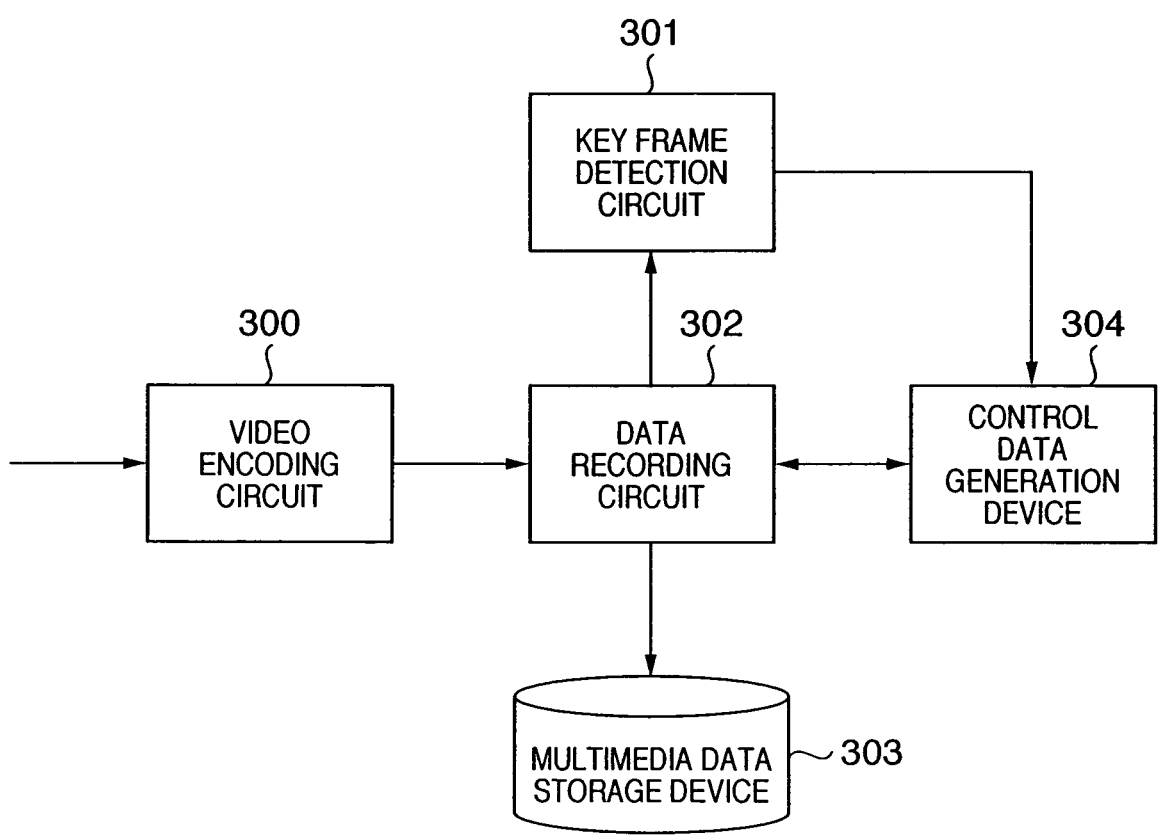
FIG. 3 shows an exemplary basic configuration of a data recording apparatus as an embodiment of the invention as well as data flows among circuits.

FIG. 3 shows a basic configuration of a data recording apparatus as an embodiment of the invention as well as data flows among circuits.

As shown in the figure, the data recording apparatus consists of a video encoding circuit 300, key frame detection circuit 301, data recording circuit 302, multimedia data storage device 303, and control data generation circuit 304.

Figure 4:
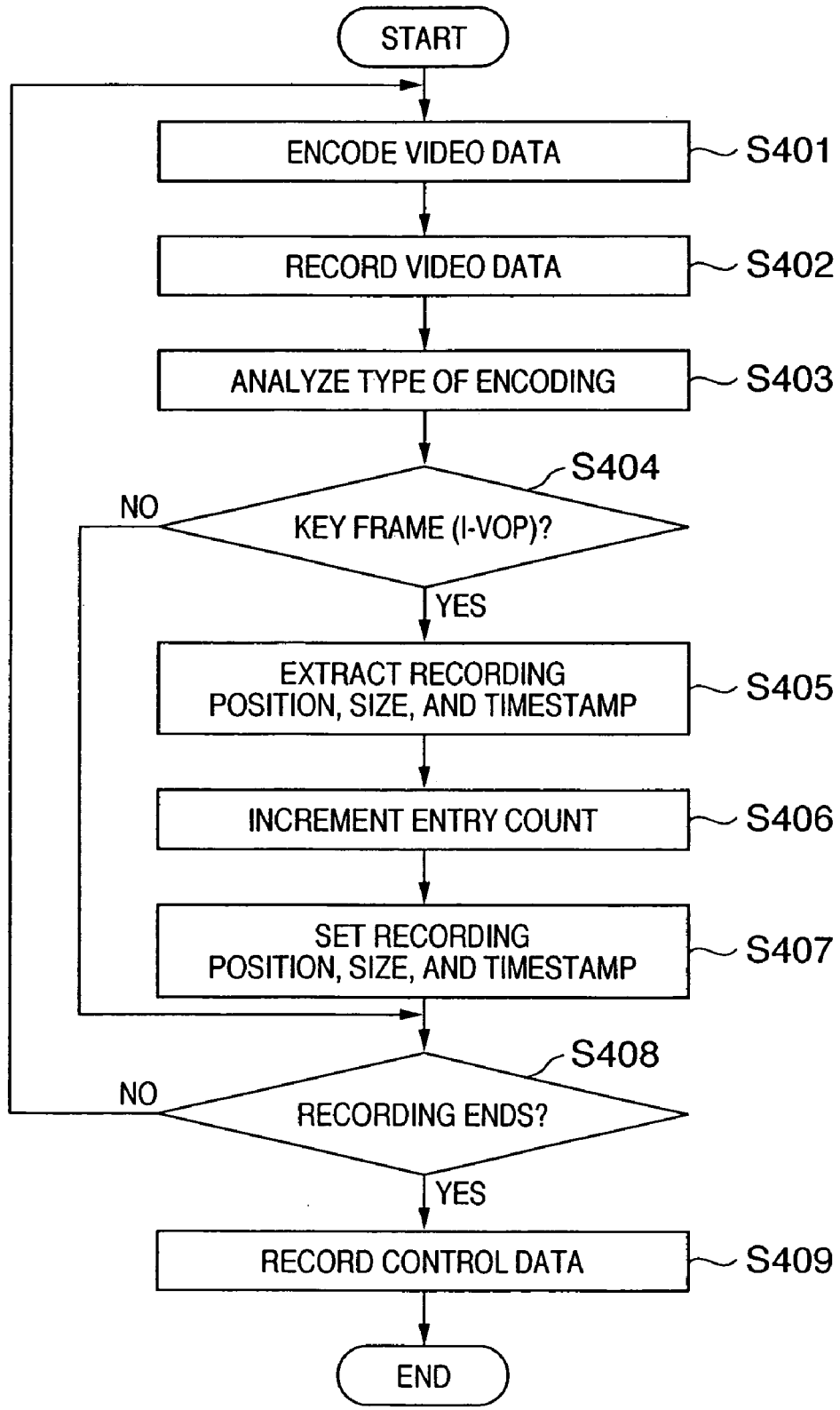
FIG. 4 is a flowchart that illustrates an example of data recording processing in the data recording apparatus according to the embodiment of the invention.

FIG. 4 shows a flowchart that illustrates an example of data recording in the data recording apparatus of the embodiment.

The video encoding circuit 300 encodes video that is inputted from an input device such as a video camera and an external storage device (step S401). Those input device and storage device are not shown in FIG. 3. Here, the video encoding circuit 300 is a circuit for encoding video with high efficiency by known MPEG-4 or H.263, for example.

The video data encoded by the video coding circuit 300 is inputted to the data recording circuit 302.

The data recording circuit 302 records the encoded video data inputted from the video coding circuit 300 into the multimedia data recording apparatus 0.303 sample by sample (step S402). In this embodiment, the data is recorded based on the data structure of ISO file format.

Although a sample is typically a unit such as an individual frame of video, a sequence of video frames that are contiguous in time, or a portion of audio that is contiguous in time, for the sake of simplicity, it is assumed in this embodiment that each frame of video is one sample.

The key frame detection circuit 301 analyzes the encoding type of the video sample that was recorded in the multimedia storage device 303 at step S402 (step S403) and determines whether it is a key frame or not (step S404). It checks if the encoded video sample is an I frame or a P and B frame, and if the sample is an I frame, it determines that the video data is a key frame.

If the encoding type of the video data has been determined not to be a key frame at step S404, special reproduction controlling data is not generated. Determination is made as to whether video data recording processing should continue or not (step S408), and if it is determined processing should continue, processing is returned to step S401.

If the encoding type of the video data has been determined to be a key frame at step S404, processing is passed to steps S405 to S407 in order to generate special reproduction controlling data.

The key frame detection circuit 301 detects the recording position, size, and timestamp of the video sample that has been recorded to the multimedia data storage device 303 by the data recording circuit 302 at step S402 (step S405).

Information on the detected recording position, size, and timestamp of the video sample is inputted to the control data generation circuit 304 and control data is generated in accordance with a certain control data structure.

FIG. 5 shows the structure of control data that is generated by the data processing apparatus of the invention.

RandomAccessPointBox (hereinafter "rdap") is a data structure that is expansion of Box defined in the ISO file format mentioned above. It provides information for facilitating random access to media, more specifically, information that identifies a key frame within video data in terms of time and location, and it is defined as Box that is contained in UserDataBox(udta) or FreeSpaceBox(free, skip) of the listing of Boxes defined in the ISO file format shown in FIG. 1. The contents of "udta", "free", and "skip" are not defined, and these Boxes and rdap, which is Box contained in them, are ignored by a conventional reproduction apparatus that does not understand the control data recorded in the embodiment. These undefined Boxes can be also considered as Boxes that are not typically accessed.

As FIG. 5 shows, rdap consists of four fields: entry_count, sample_timestamp, sample_offset, and sample_size. The entry_count indicates an integer that gives the number of subsequent entries in the table and sample_timestamp indicates an integer that gives a randomly-accessible timestamp in a stream. The sample_offset indicates an integer that gives the recording position (file offset) of a randomly-accessible sample and sample_size indicates an integer that gives the size of a randomly-accessible sample.

Upon receiving the information on the detected key frame from the key frame detection circuit 301, the control data generation circuit 304 increments the entry_count of rdap mentioned above to count the total number of samples that can be randomly accessed (step S406). It also sets information on the recording position, size, and timestamp of the sample in the sample_offset, sample_size, and sample_timestamp fields, respectively (step S407).

Once the special reproduction controlling data has been generated at the control data generation circuit 304 in such a manner, determination is made as to whether video data recording processing should continue or not (step S408), and if it is determined that processing should continue, it returns processing to step S401. In this way, special reproduction controlling data is generated for a sequence of video frames up to the end of recording.

If it is determined at step S408 that recording should end, the control data generated at the control data generation circuit 304 is recorded into a predetermined area of the multimedia data storage device 303 via the data recording circuit 302 (step S409).

Figure 6:
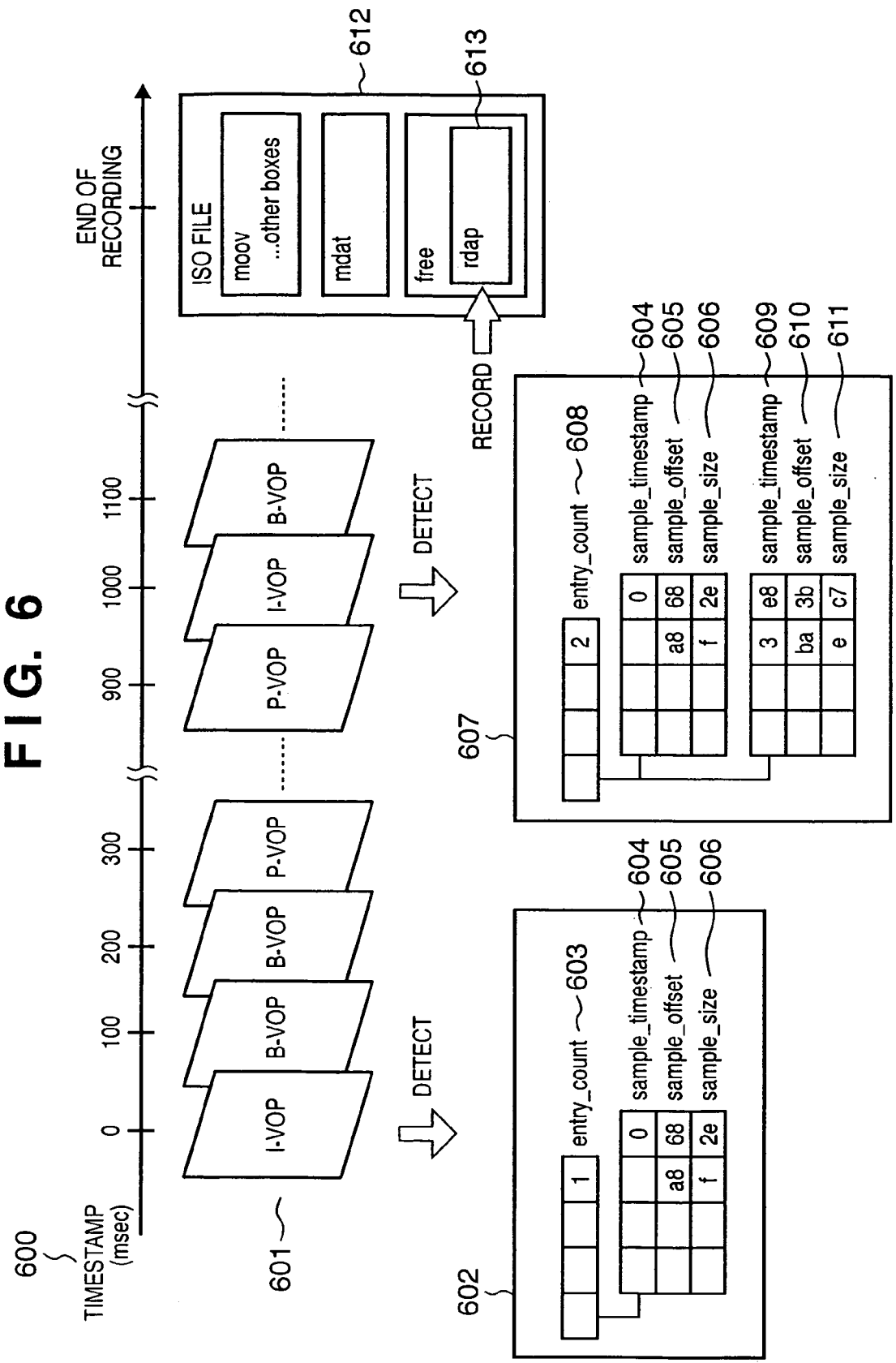
FIG. 6 shows a specific example of control data that is generated by the data recording apparatus according to the embodiment of the invention.

FIG. 6 shows an example of special reproduction controlling data that is generated by the data recording apparatus of the invention.

Timestamp 600 is time in milliseconds and video 601 is a sequence of video frames that have been encoded at the video coding circuit 300. As shown in FIG. 6, video frames are here encoded at intervals of 100 milliseconds. It is also assumed that a frame that has timestamps at time 0 millisecond and time 1000 millisecond is encoded within a frame (I-VOP) and frames that are otherwise time-stamped are inter-frame predictive encoded (B-VOP or P-VOP).

Control data 602 is control data generated for a video frame that is intra-frame encoded with a timestamp of 0 millisecond.

Since the total number of randomly-accessible samples is one at this point, the value of entry_count 603 is one. Also, the timestamp of the video frame is zero millisecond, recording position is an offset of 0xa868 bytes, and the size of the video frame is 0xf2e bytes, thus the value of sample_timestamp 604 is set to 0, that of sample_offset 605 is to 0xa868, and that of sample_size 606 is to 0xf2e.

Since subsequent video frames having timestamps between 100 milliseconds and 900 milliseconds are inter-frame predictive encoded frames, no control data is generated for those frames.

Control data 607 is control data that is generated for video frames that are intra-frame encoded with timestamp of 1000 milliseconds.

As the total number of randomly-accessible samples has become two, for the control data 607, the value of entry_count 608 is incremented to two from entry_count 603 for the control data 602. In addition, at this point, the timestamp of the video frame is 1000 milliseconds, its recording position is an offset of 0xba3b bytes, and the size of the video frame is 0xec7 bytes, thus the value 0x3eb for sample_timestamp 609, the value 0xba3b for sample_offset 610, and the value 0xec7 for sample_size 611 are added to control data 602.

Similar processing is executed for a sequence of subsequent video frames and generated control data will be recorded as rdap 613 in freeBox mentioned above at the end of the ISO file 612 when recording ends.

(Reproduction Apparatus)

Figure 7:
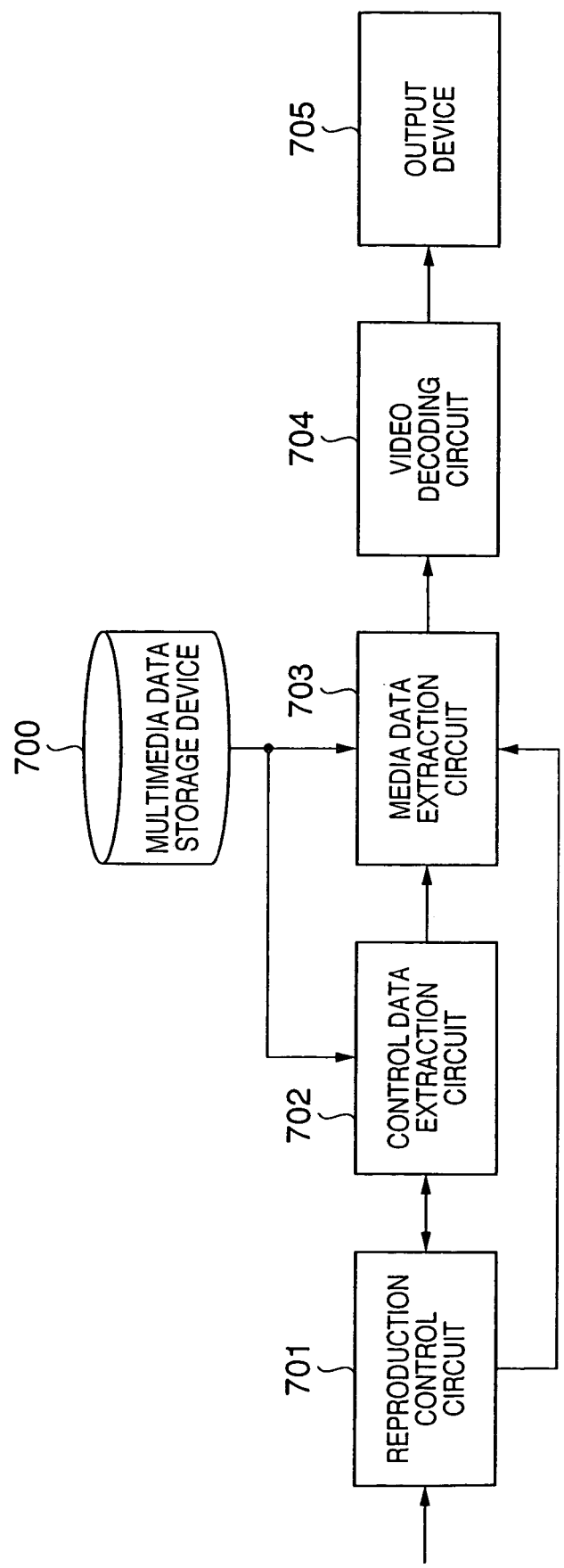
FIG. 7 shows an exemplary basic configuration of a data reproduction apparatus according to the embodiment of the invention as well as data flows among circuits.

A data reproduction apparatus as an embodiment of the invention will be now described in detail. FIG. 7 shows a basic configuration of the data reproduction apparatus as an embodiment of the invention as well as data flows among circuits.

As shown, the data reproduction apparatus consists of a multimedia data storage device 700, reproduction control circuit 701, control data extraction circuit 702, encoded multimedia data extraction circuit 703, video decoding circuit 704, and output device 705.

Figure 8:
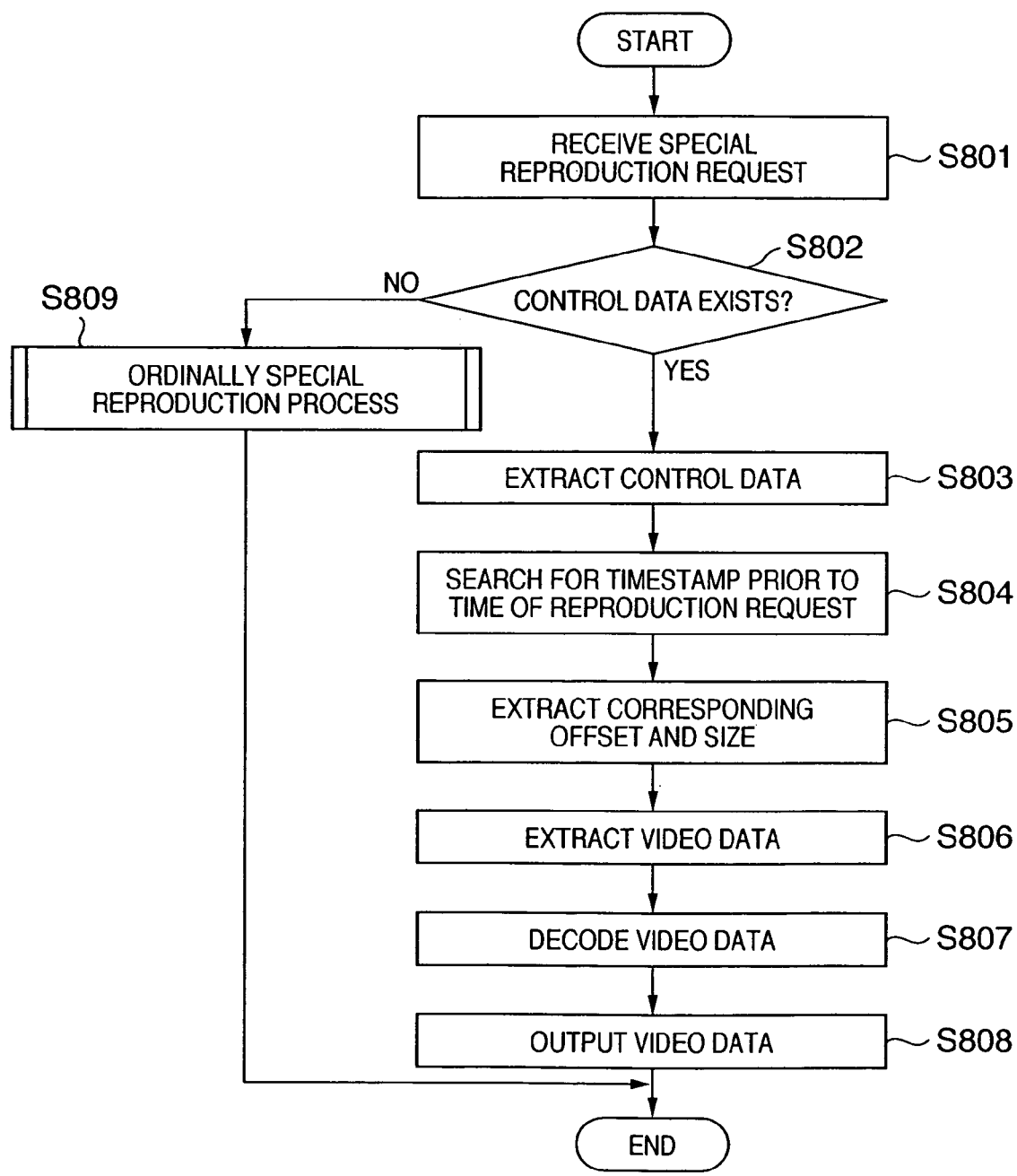
FIG. 8 is a flowchart that illustrates an example of data reproduction processing in the data reproduction apparatus according to the embodiment of the invention.

FIG. 8 is a flowchart that illustrates special reproduction of multimedia data in the data reproduction apparatus of the embodiment.

When it receives a request for special reproduction from a user (step S801), the reproduction control circuit 701 requests the control data extraction circuit 702 to extract special reproduction controlling data in multimedia data.

The control data extraction circuit 702 determines whether or not special reproduction controlling data is recorded in an ISO file recorded in the multimedia data storage device 700 that will be played back (step S802). It searches for rdap that is recorded in freeBox of the ISO file that has been recorded by the above-described data recording apparatus, and if rdap does not exist or the value of the number of entries (entry_count) in rdap is zero, it determines that special reproduction data has not been recorded.

If it is determined at step S802 that there is no special reproduction data, reproduction control is executed through conventional special reproduction processing (step S809) so as to implement special reproduction such as random access in the manner explained in the prior art earlier.

If it is determined at step S802 that special reproduction data exists, special reproduction controlling data rdap recorded in the ISO file is extracted (step S803) and inputted into the reproduction control circuit 701.

The reproduction control circuit 701 needs to detect the optimal video sample from the playback start time t that is designated by the special reproduction request generated by a user pressing a fast-forward button during reproduction for example, and from the special reproduction controlling data that has been inputted from the control data extraction circuit 702.

So, in order to find a first randomly-accessible sample prior to time t that is designated by the reproduction start request, the reproduction control circuit 701 searches for the first timestamp prior to time t from timestamps of control data entries (sample_timestamp of rdap) (step S804).

Next, it extracts the offset (sample_offset) and size (sample_size) that are recorded in the same entry as the found timestamp (step S805).

The offset and size thus extracted indicate the offset (recording position) and size of the first randomly-accessible sample in the ISO file prior to time t that has been designated by the reproduction start request. These pieces of information are inputted to the encoded media data extraction circuit 703. The encoded media extraction circuit 703 extracts sample data having the inputted offset and the size from the ISO file recorded in the multimedia data storage device 700 (step S806).

The data extracted by the encoded media data extraction circuit 703 is inputted to the video decoding circuit 704 and the encoded video data sample is decoded there (step S807). The decoded video data is provided to the output device 705 represented by a display and played back (step S808).

FIG. 9 shows an example where the data reproduction apparatus of the embodiment implements special reproduction using special reproduction controlling data. The ISO file 612 is an ISO file that is created by the data recording apparatus of the invention described with FIG. 6, containing control data rdap 613.

The number of entries (entry_count 902) in the control data 613 is 0x64, indicating that the total number of randomly-accessible samples is 100.

Also, within rdap 613, the first entry is recorded for a sample 900 that has timestamp of 0 millisecond (sample_timestamp604), recording_position of 0xa868 bytes (sample_offset605), and a size of 0xf2e bytes (sample_size606) as in FIG. 6. The second entry is for a sample 901 that has timestamp of 1000 (=0x3e8) milliseconds (sample_timestamp609), recording position of 0xba3b bytes (sample_offset610), and a size of 0xec7 bytes (sample_size611). Description of other entries is omitted.

When a special reproduction request from a user is received for the ISO file 612 containing such control data, the data reproduction apparatus of the embodiment operates as follows. For example, if a request for random access to timestamp of 1200 milliseconds is received, it detects the first timestamp before 1200 milliseconds from timestamps of entries of control data 613 in order to find the optimal sample. In this case, timestamp of 1000 milliseconds (sample_timestamp609) will be detected.

The detected timestamp (sample_timestamp609) is the second entry in the control data 613. Thus, in accordance with position information (sample_offset610) and size information (sample_size611) that are also recorded in the second entry, the sample data 901 having the size of 0xec7 bytes is extracted and decoded from the position at offset 0xba3b in the ISO file 612.

Thus, according to the embodiment, special reproduction data used for special reproduction is recorded using the ISO file format and special reproduction is implemented using the special reproduction data. This can improve the efficiency of complicated frame extraction processing during special reproduction (i.e. random access or fast-forward) of data having ISO file format. Also, by positioning reproduction controlling data in an area that is ignored by conventional apparatuses, it is possible to record data in a manner that does not affect standards and record data that can be played back by conventional reproduction apparatuses.

Other Embodiments

Although the recording apparatus has the capability to perform encoding of video data in the above-described embodiment, it may obtain encoded data and perform processing at step S402 and subsequent steps of FIG. 4 to the data. That is, the recording apparatus may have only capability of adding control data as described above to encoded video data.

While the recording apparatus and the reproduction apparatus according to the embodiment have been described as separate devices above, they may be a recording/reproduction apparatus that has functions of both a recording apparatus and a reproduction apparatus, of course.

Also, such a case is also within the scope of the invention where a software program that implements the functions of the embodiment above is supplied directly or over a wired/wireless communication from a storage medium to a system or apparatus that includes a computer that can execute the program and the system or apparatus executes the program to attain equivalent functions.

Accordingly, a program code itself that is supplied to or installed in a computer for implementing the functions of the invention on a computer also implements the invention. In other words, a computer program itself for implementing the functions of the invention is also within the scope of the invention.

The computer program may be of any form, e.g. an object code, a program executed by an interpreter, or script data supplied to an OS, as long as it has program functions.

Storage media for supplying the program includes a flexible disk, hard disk, magnetic recording medium such as magnetic tape, optic/magneto-optical storage media such as MO, CD-ROM, CD-R, CD-RW, DVD-ROM, DVD-R, and DVD-RW, and non-volatile semiconductor memory, for example.

To supply a program using wired/wireless communication, a data file (program data file) that can become a computer program that forms the invention on a client computer, such as a computer program itself that forms the invention, or a file that is compressed and has an automatic installation capability, may be stored on a server on a computer network, and the program data file may be downloaded to a client computer that accesses the server. In this case, the program data file may be divided into a plurality of segment files and those segment file may be positioned on different servers.

That is, a server device that allows a plurality of users to download a program data file for implementing the functions of the invention on a computer is also within the scope of the invention.

Alternatively, the program for the invention may be encrypted and stored in a storage medium such as CD-ROM to be distributed to users. And those users who meet predetermined conditions may be provided with key information for decoding the encrypted program by allowing them to download the key information from a website over the Internet. The uses can use the key information to execute the encrypted program to be installed in a computer so as to implement the invention.

The functions of the embodiments described above can be also realized by a computer executing a read-out program, or by an OS running on a computer performing some or all the actual processing in accordance with the direction of the program.

The functions of the embodiment described above may also be realized in such a manner that a program read from the storage medium is written to a memory provided on a function extension board inserted to a computer or a function extension unit attached to the computer, and a CPU and the like of the function extension board or function extension unit implements some or all of the actual processing in accordance with the direction of the program.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-256386 filed Sep. 3, 2004, which is hereby incorporated by reference herein

What is claimed is:

1. A data recording apparatus, comprising:
a key frame detection unit configured to detect randomly-accessible key frames from encoded video data;
a control data generation unit configured to generate reproduction controlling data, wherein the reproduction controlling data that includes (a) time stamp information relating to reproduction time locations of the randomly-accessible key frames and (b) file offset information indicating data locations in the encoded video data at which the randomly-accessible key frames are positioned and excludes (c) time stamp information of non-randomly accessible frames and (d) offset information of the non-randomly accessible frames; and
a file generation unit configured to generate the file that contains said video data and said reproduction controlling data generated by said control data generation unit, wherein the reproduction controlling data is positioned in an area which is within the file and ignored by a reproduction apparatus that does not understand the reproduction controlling data.

2. The data recording apparatus according to claim 1, wherein said reproduction controlling data further contains the total number of key frames within said encoded video data that are detected by said key frame detection means.

3. The data recording apparatus according to claim 1, wherein said encoded video data includes frames that are intra-frame encoded and frames that are inter-frame encoded, and said key frames are said intra-frame encoded frames and said frames other than the key frames are said inter-frame encoded frames.

4. A non-transient computer-readable recording medium that has stored thereon a computer program for causing a computer to execute the data recording apparatus according to claim 1.

5. A data recording method executed by a data recording apparatus, the data recording method comprising the steps of:
a key frame detection step of detecting randomly-accessible key frames from encoded video data;
a control data generation step of generating reproduction controlling data, wherein the reproduction controlling data that includes (a) time stamp information relating to reproduction time locations of the randomly-accessible key frames and (b) file offset information indicating data locations in the encoded video data at which the randomly-accessible key frames are positioned and excludes (c) time stamp information of non-randomly accessible frames and (d) offset information of the non-randomly accessible frames; and a file generation step of generating the file that contains said video data and said reproduction controlling data generated by said control data generation step, wherein the reproduction controlling data is positioned in an area which is within the file and ignored by a reproduction apparatus that does not understand the reproduction controlling data.

6. The data recording apparatus according to claim 1, wherein
the reproduction controlling data is positioned in an area within the file which are not accessed by the reproduction apparatus that does not understand the reproduction controlling data.

7. The data recording method according to claim 5, wherein
the reproduction controlling data is positioned in an area within the file which are not accessed by the reproduction apparatus that does not understand the reproduction controlling data.

* * * * *